United States Patent [19]
McGregor

[11] Patent Number: 5,986,548
[45] Date of Patent: Nov. 16, 1999

[54] RADIO-LINKED INTRUSION ALARM SYSTEM

[76] Inventor: Gerald C. McGregor, 6096 SW. 29th Place, Ft. Lauderdale, Fla. 33314

[21] Appl. No.: 08/696,617

[22] Filed: Aug. 14, 1996

[51] Int. Cl.$^6$ .................................................. G08B 13/02
[52] U.S. Cl. ........................ 340/539; 340/427; 340/545; 340/566; 340/693
[58] Field of Search .................................. 340/539, 693, 340/333, 566, 545, 427, 429

[56] References Cited

U.S. PATENT DOCUMENTS

| | | | |
|---|---|---|---|
| 3,192,517 | 6/1965 | Werlin | 340/566 |
| 4,618,857 | 10/1986 | Dubois et al. | 340/333 |
| 5,200,735 | 4/1993 | Hines | 340/539 |
| 5,319,698 | 6/1994 | Glidewell et al. | 340/539 |
| 5,512,880 | 4/1996 | Abrams et al. | 340/693 |
| 5,534,847 | 7/1996 | McGregor | 340/427 |

*Primary Examiner*—Glen Swann

[57] ABSTRACT

A movement detector situated within a portable housing is coupled to an access to an entity. The movement detector generates a movement signal upon the vibration or moving of the movement detector. A transmitter transmits a remote motion detection signal via free space upon the receipt of the movement signal. The movement detector is powered by a battery situated within the portable housing thereof. Controller circuitry having an input terminal is coupled to a movement detector receiver which generates an alarm activation signal at an output thereof upon the receipt via free space of the remote motion detection signal. The controller circuitry further has an output terminal for transmitting an alarm activation signal upon receipt of the alarm activation signal at the input terminal thereof. Also included is a transmitter coupled to the output terminal of the controller circuitry for transmitting an alarm signal to a remote location through space upon receipt of the alarm activation signal. Finally, a portable user component is included comprising a receiver for transmitting an alarm activation signal upon receipt of the alarm signal from the transmitter. Alarm means are coupled to the receiver for transmitting an alarm upon receipt of the alarm activation signal.

3 Claims, 7 Drawing Sheets

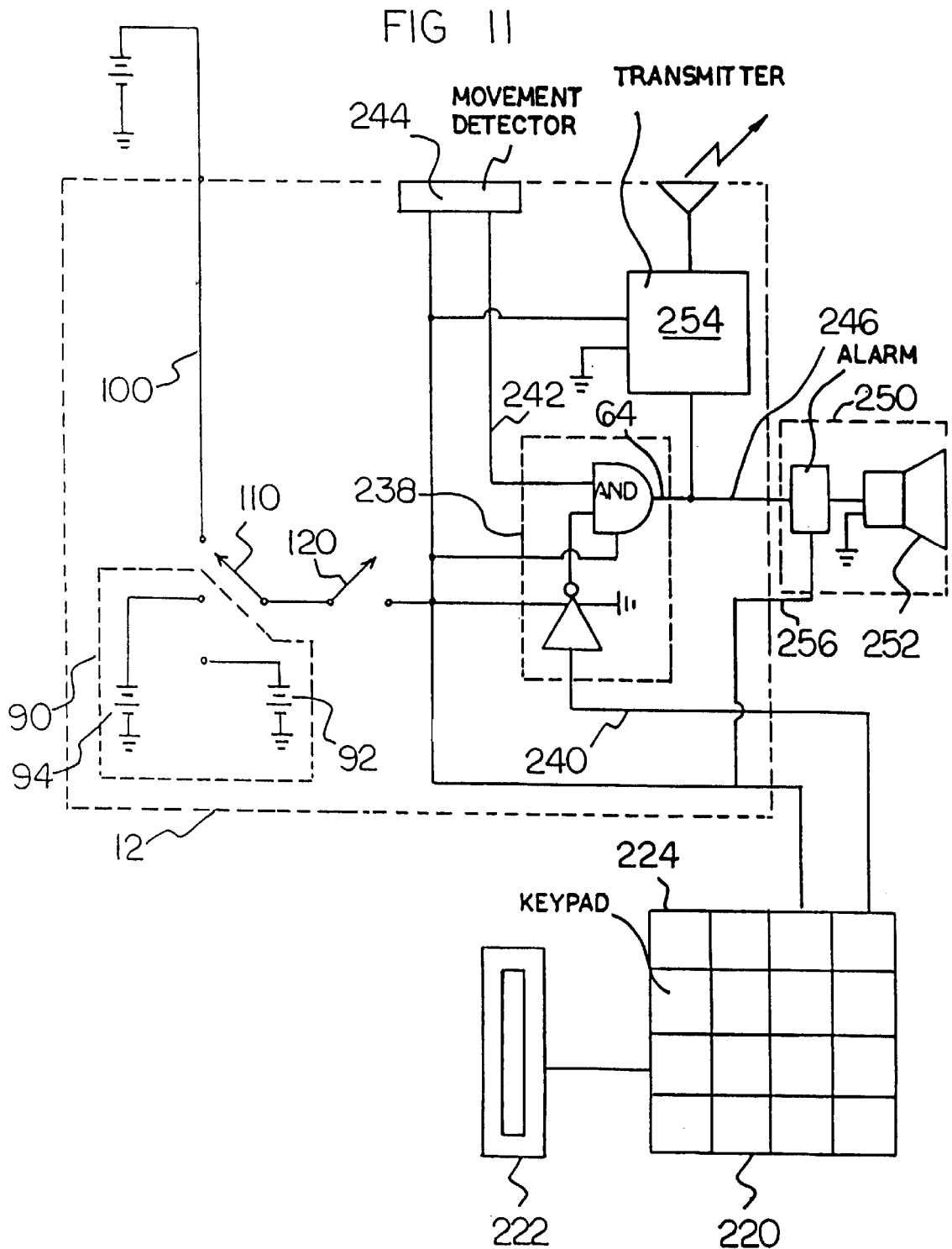

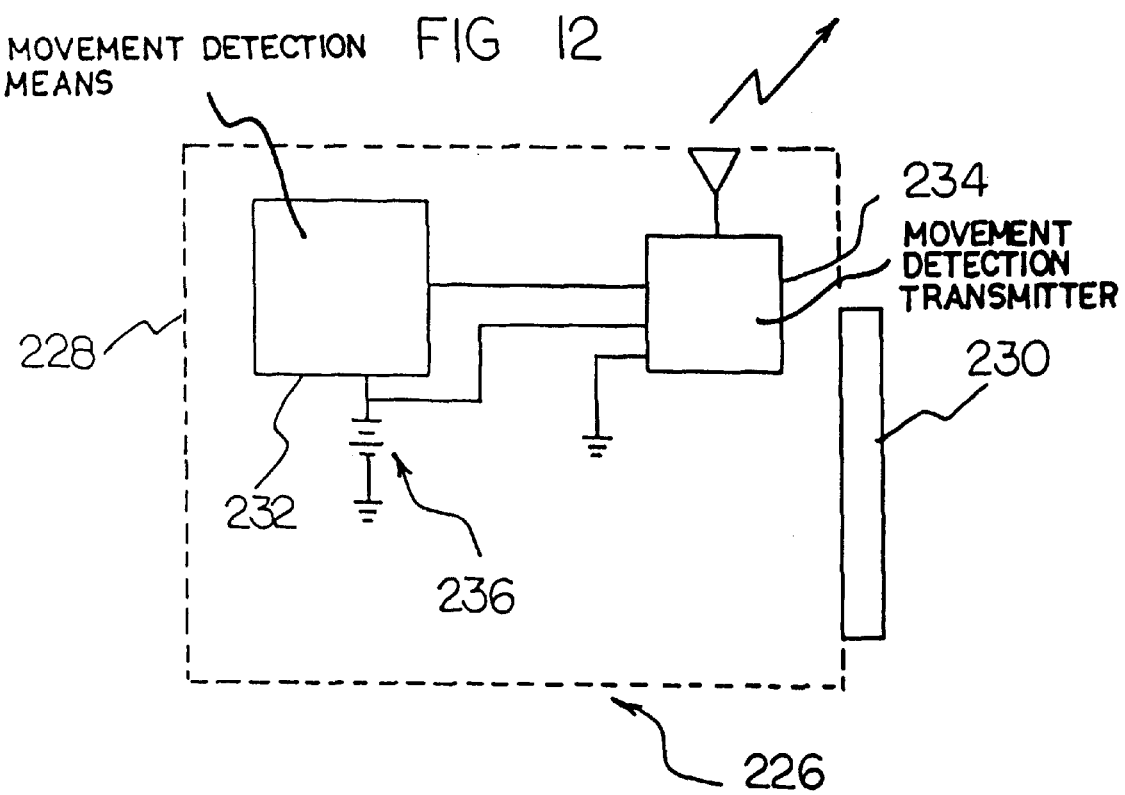

RADIO-LINKED INTRUSION ALARM SYSTEM

BACKGROUND OF THE INVENTION

1. Field of the Invention

The present invention relates to an alarm system and more particularly pertains to actuating both audible and silent alarm measures upon the detection of movement and further providing supplementary theft prevention measures.

2. Description of the Prior Art

The use of alarm mechanisms is known in the prior art. More specifically, alarm mechanisms heretofore devised and utilized for the purpose of preventing unauthorized access of an entity are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 255,882 to Kim discloses an alarm and page signal transmitter. U.S. Pat. No. 3,828,310 to Miller discloses a theft alarm. U.S. Pat. No. 3,941,081 to Nakamura discloses an alarm for a bicycle. U.S. Pat. No. 5,262,757 to Hansen discloses an electronic signaling device for bicycles and the like. U.S. Pat. No. 5,270,681 to Jack discloses a theft alarm apparatus.

In this respect, the alarm system according to the present invention substantially departs from the conventional concepts and designs of the prior art, and in doing so provides an apparatus primarily developed for the purpose of actuating both audible and silent alarm measures upon the detection of movement and further providing supplementary theft prevention measures.

Therefore, it can be appreciated that there exists a continuing need for new and improved alarm system which can be used for preventing unauthorized access to an entity. In this regard, the present invention substantially fulfills this need.

SUMMARY OF THE INVENTION

In the view of the foregoing disadvantages inherent in the known types of alarm mechanisms now present in the prior art, the present invention provides an improved alarm system. As such, the general purpose of the present invention, which will be described subsequently in greater detail, is to provide a new and improved alarm system and method which has all the advantages of the prior art and none of the disadvantages.

To attain this, the present invention essentially comprises a keypad controlled security mechanism coupled to a conventional door bell, the keypad controlled security mechanism having a keypad adapted to emit an alarm disarm signal upon the depression of a predetermined sequenced set of keys and further the subsequent depression of the door bell for a predetermined time period, wherein the keypad has a matrix of keys with numbers and letters printed thereon out of order; a movement detector situated within a portable housing having a magnet formed thereon for allowing the coupling thereof to an access to an entity, the movement detector having a movement detection means adapted to generate a movement signal upon the movement of the movement detector and a movement detection transmitter connected to the movement detection means for transmitting a remote motion detection signal via free space upon the receipt of the movement signal, wherein the movement detector is powered by a battery situated within the portable housing thereof; controller circuitry situated within a housing having a first input terminal coupled to the keypad controlled security mechanism, a second input terminal coupled to a movement detector receiver also situated within the housing which is adapted to generate an alarm activation signal at an output thereof upon the receipt via free space of the remote motion detection signal, and an output terminal having one mode for transmitting an alarm activation signal upon receipt of the alarm activation signal without the receipt of the alarm disable signal and another mode for precluding the transmission of an alarm activation signal upon the receipt of the alarm disarm signal; a conventional alarm with an associated speaker coupled to the output terminal of the controller circuitry for transmitting an audible high frequency alarm signal upon receipt of the alarm activation signal; a transmitter located within the housing and coupled to the output terminal of the controller circuitry for transmitting an alarm signal to a remote location through space upon receipt of the alarm activation signal; a power source located within the housing and coupled to the keypad controlled security mechanism, the controller circuitry, the movement detector receiver, and the transmitter for supplying electrical energy thereto, wherein the power source is formed of a main battery and a back-up battery; a power cable having an interior terminal end and an exterior terminal end with the exterior terminal end coupleable to an external power source for receiving electrical energy therefrom; a power switch located within the housing and coupled between the internal power source and interior terminal of the power cable with the power switch having a first orientation for allowing electrical energy to be supplied from the main battery of the power source, a second orientation for allowing electrical energy to be supplied from the back-up battery of the power source, and a third orientation for allowing electrical energy to be supplied through the power cable; and a user component comprising a flexible strap having securement means on one end and securable means on the other end with the securable means coupleable with the securement means in a closed loop configuration about a wrist of a user; a rigid box-shaped container having a bottom wall coupled to the strap between the ends thereof, a top wall, and a periphery of four side walls interconnecting the top wall with the bottom wall to define a hollow interior; a receiver disposed within the container for transmitting an alarm activation signal upon receipt of the alarm signal from the transmitter; a speaker disposed within the container, coupled to the receiver, and extended through the top wall of the container for transmitting an audible high-frequency alarm upon receipt of the alarm activation signal; a battery disposed within the container for supplying electrical energy; and a power switch coupled between the battery and receiver and extended through the top wall of the container and with the power switch having one orientation for allowing electrical energy to be delivered to the receiver and another orientation for preventing such delivery.

There has thus been-outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved alarm system which has all the advantages of the prior art alarm mechanisms and none of the disadvantages.

It is another object of the present invention to provide a new and improved alarm system which may be easily and efficiently manufactured and marketed.

It is a further object of the present invention to provide a new and improved alarm system which is of durable and reliable construction.

An even further object of the present invention is to provide a new and improved alarm system which is susceptible of a low cost of manufacture with regard to both materials and labor, and which accordingly is then susceptible of low prices of sale to the consuming public, thereby making such an alarm system economically available to the buying public.

Still yet another object of the present invention is to provide a new and improved alarm system which provides in the apparatuses and methods of the prior art some of the advantages thereof, while simultaneously overcoming some of the disadvantages normally associated therewith.

Even still another object of the present invention is to provide a new and improved alarm system which employs a keypad controlled security mechanism for disarming the alarm system with the keypad thereof having a matrix of keys with numbers and letters printed thereon but of order to confuse a perpetrator.

Yet another object of the present invention is to provide a new and improved alarm system which employs a keypad controlled security mechanism for disarming the alarm system, wherein the keypad controlled security mechanism requires the depression of a doorbell to gain access to an entity.

Another object of the present invention is to provide a new and improved alarm system including a plurality of portable movement detectors attached on or adjacent to access ways to an entity, whereby the movement detectors are capable of detecting movement in the form of moving & vibration of the item which it is attached to.

Still another object of the present invention is to provide a new and improved alarm system including circuitry adapted to effect proper operation of the present invention.

Lastly, it is an object of the present invention to provide a new and improved alarm system for preventing unauthorized access to an entity including a movement detector situated within a portable housing coupled to an access to an entity. The movement detector has a movement detection means adapted to generate a movement signal upon the vibration or moving of the movement detector. The movement detection transmitter is connected to the movement detection means for transmitting a remote motion detection signal via free space upon the receipt of the movement signal. The movement detector is powered by a battery situated within the portable housing thereof. Further provided is controller circuitry having an input terminal coupled to a movement detector receiver which is adapted to generate an alarm activation signal at an output thereof upon the receipt via free space of the remote motion detection signal. The controller circuitry further has an output terminal for transmitting an alarm activation signal upon receipt of the alarm activation signal at the input terminal thereof. Also included is a transmitter coupled to the output terminal of the controller circuitry for transmitting an alarm signal to a remote location through space upon receipt of the alarm activation signal. Finally, a portable user component is included comprising a receiver for transmitting an alarm activation signal upon receipt of the alarm signal from the transmitter. Alarm means are coupled to the receiver for transmitting an alarm upon receipt of the alarm activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 is a schematic diagram of the controller circuitry employed in an alternate embodiment of the present invention.

FIG. 12 is a schematic diagram of the movement detector employed in the alternate embodiment of the present invention.

FIG. 13 is an exploded view of the keypad controlled security mechanism of the present invention.

The same reference numerals refer to the same parts through the various Figures.

DESCRIPTION OF THE PREFERRED EMBODIMENT

Figure 1:
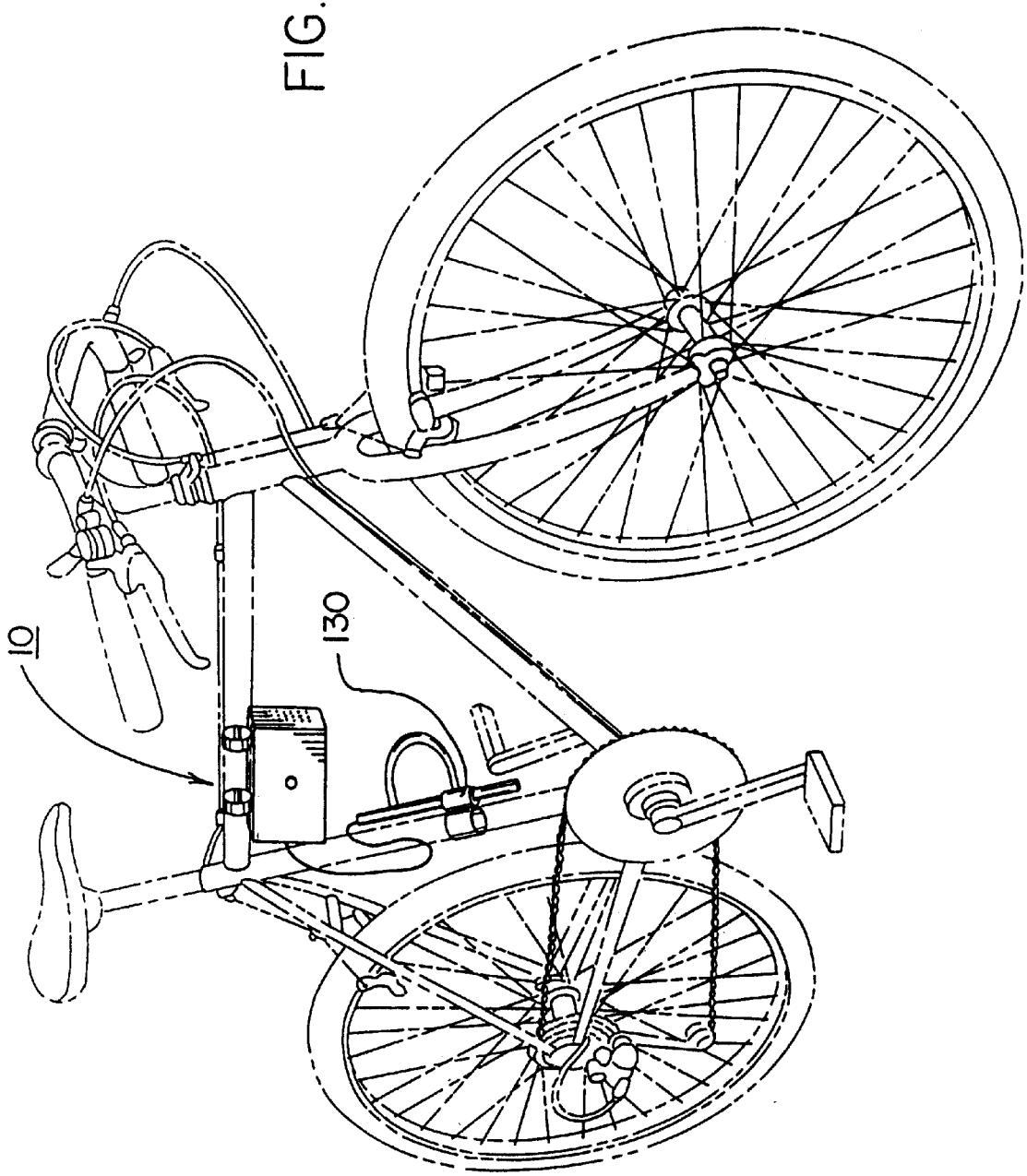
FIG. 1 is a perspective view of the bicycle component of the present invention secured to a user's bicycle.
Figure 2:
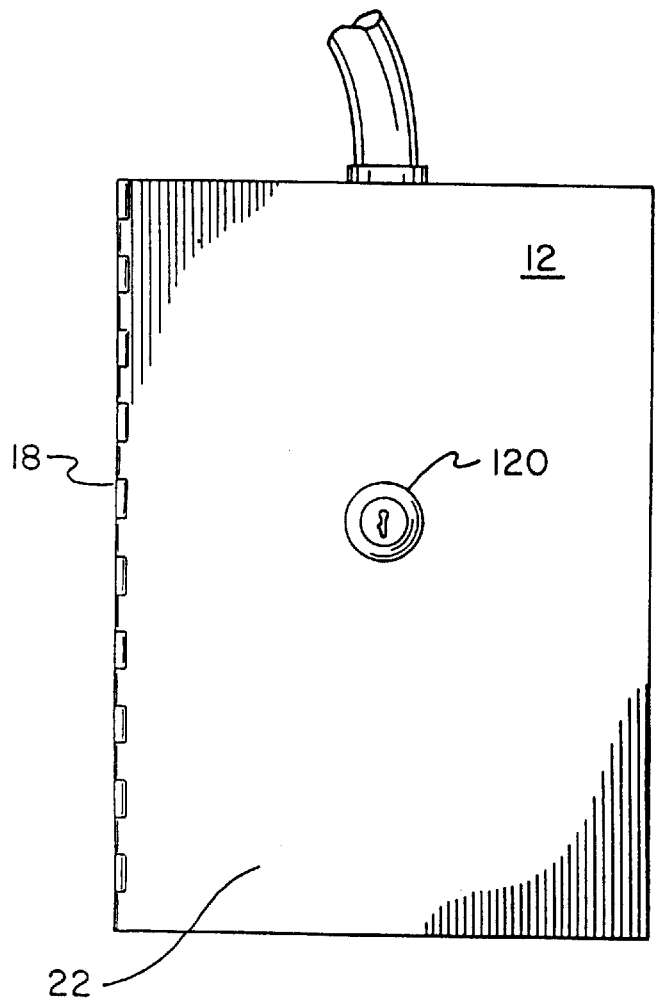
FIG. 2 is a view of the housing of the bicycle component of the present invention.
Figure 3:
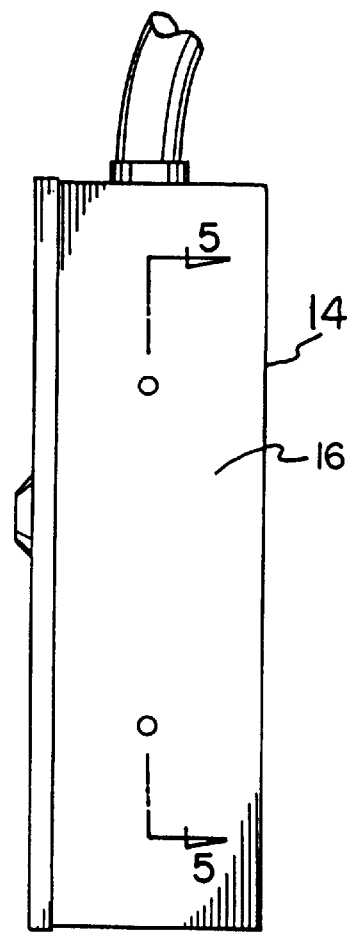
FIG. 3 is yet another view of the housing of the bicycle component of the present invention.
Figure 4:
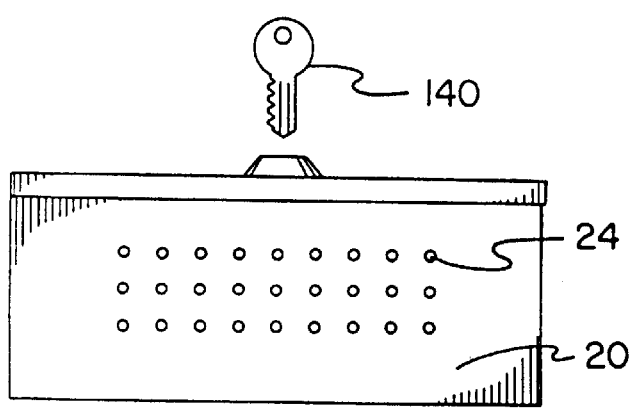
FIG. 4 is still yet another view of the housing of the bicycle component of the present invention further depicting the perforations through a side wall.
Figure 5:
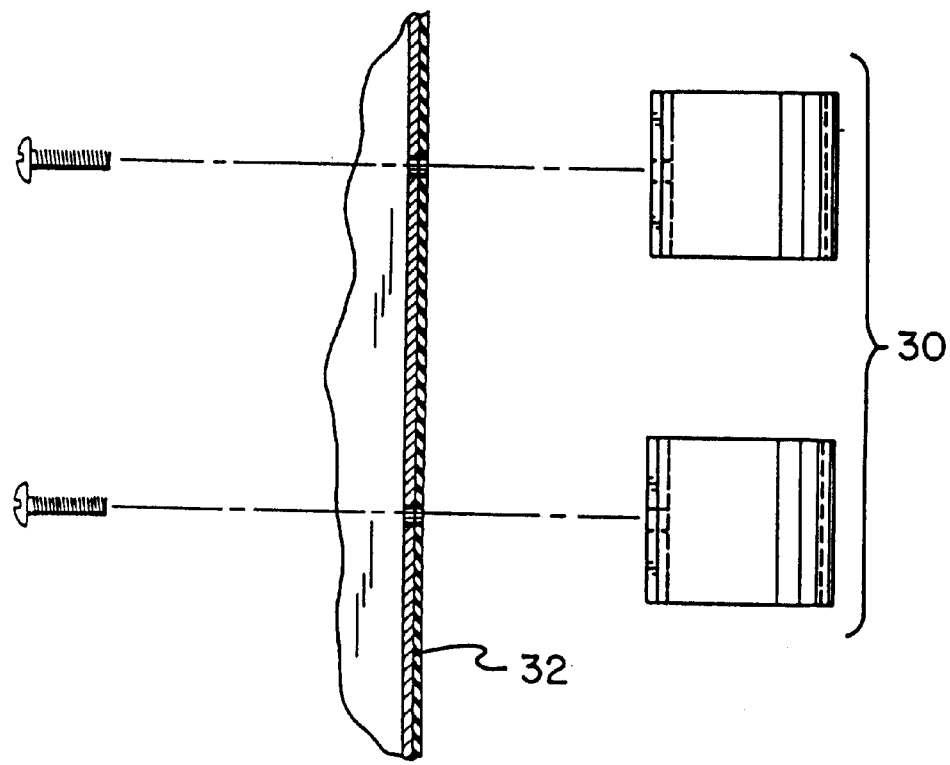
FIG. 5 is an exploded cross-sectional view depicting the coupling between the clamp means of the bicycle component and a frame of a bicycle.
Figure 6:
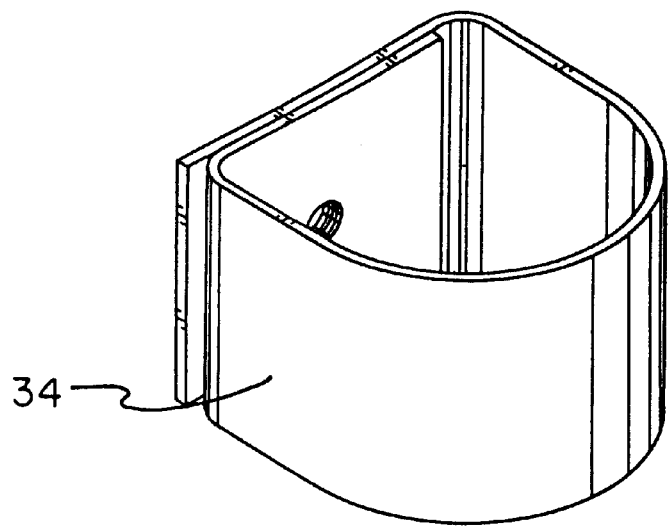
FIG. 6 is an enlarged view of a portion of the clamp means of the bicycle component.
Figure 7:
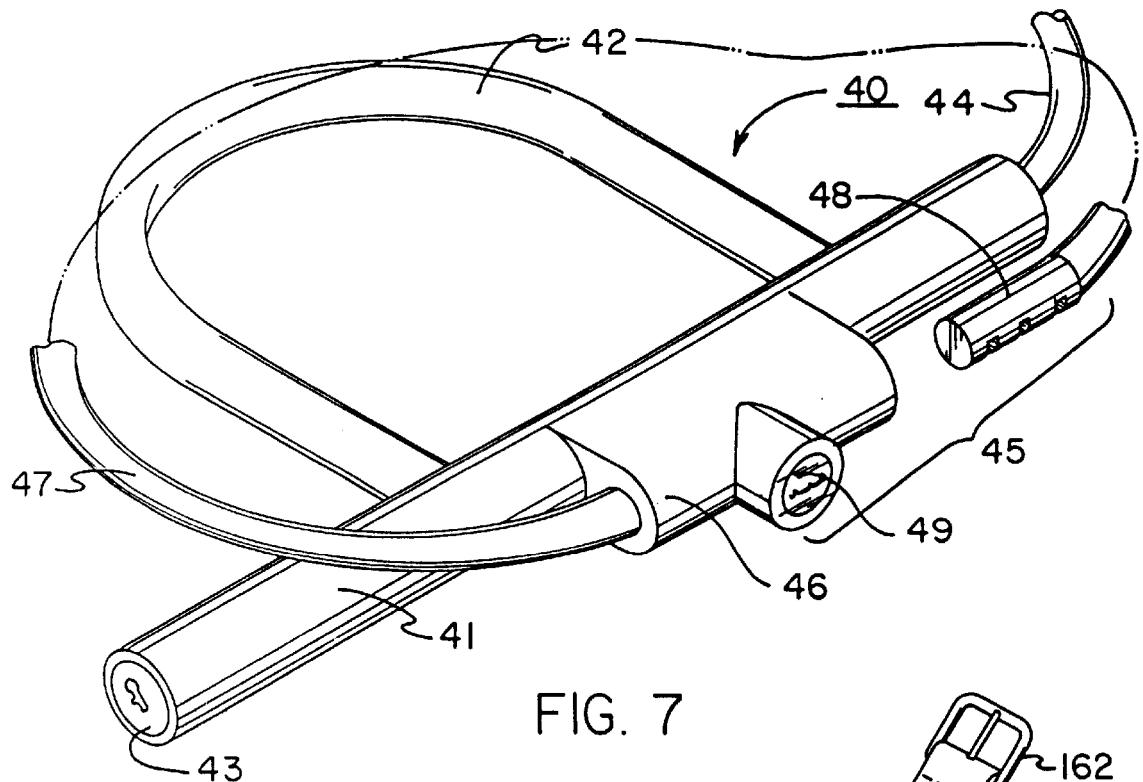
FIG. 7 is an enlarged perspective view of the locking clamp of the bicycle component.
Figure 8:
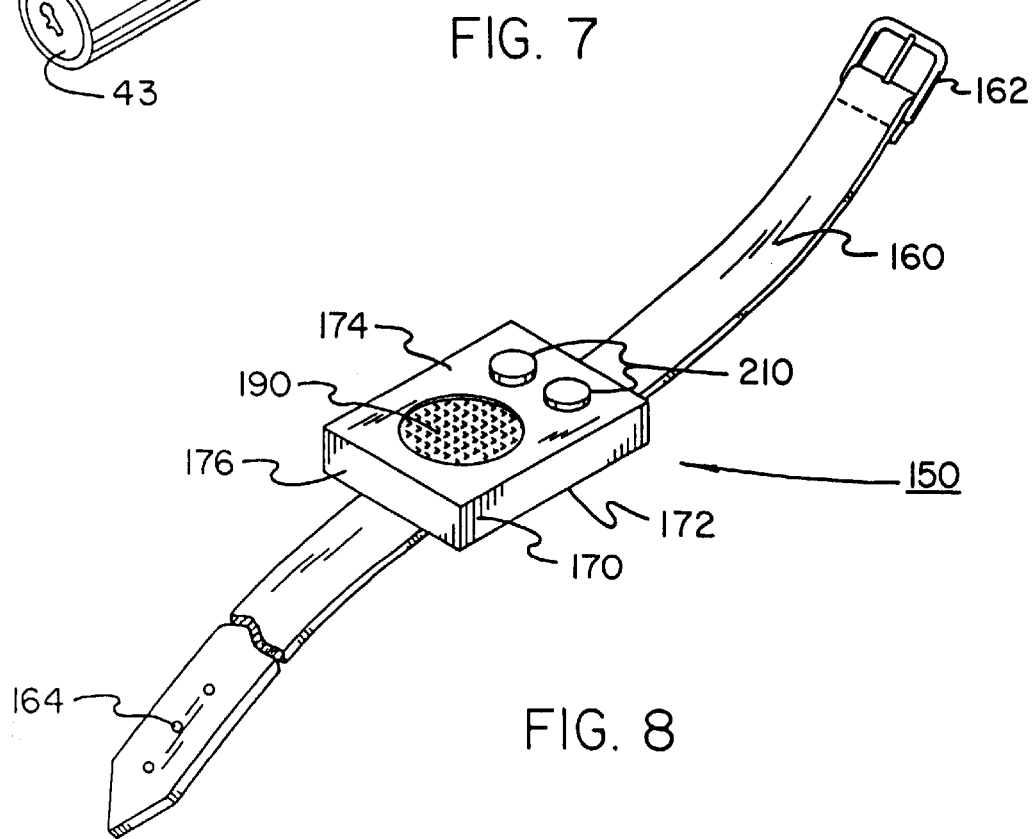
FIG. 8 is a perspective view of the user component of the preferred embodiment constructed in accordance with the principles of the present invention.

With reference now to the drawings, and in particular, to FIG. 1 thereof, the preferred embodiment of the new and improved alarm system embodying the principles and concepts of the present invention and generally designated by the reference numbers 10 and 150 will be described.

Specifically, the present invention includes two major components. The major components are the bicycle component and the user component. These components are interrelated to provide the intended function of preventing and warning of unauthorized access of a user's bicycle.

More specifically, it will be noted in the various Figures that the first major component is the bicycle component 10. The bicycle component essentially includes thirteen subcomponents. The subcomponents are the housing, clamp means, key-lockable clamp, motion detector, controller circuitry, speaker, transmitter, power source, power cable, power switch, activation switch, holding clamp, and key. These subcomponents are interrelated to provide the intended function.

The first subcomponent of the bicycle component is the housing 12. The housing is box-shaped and is formed of metal, plastic, or other such rigid material. The housing includes a rectangular back wall 14, and a periphery formed of a top wall 16, a bottom wall 18, and opposed side walls 20 extended outwards from the back wall to define a hollow interior and a front opening. The housing also includes a lid 22. The lid is pivotally coupled to the bottom wall. The lid is positionable over the front opening for preventing access to the interior. Furthermore, one of the side walls of the housing includes a plurality of perforations 24 disposed therethrough.

The second subcomponent of the bicycle component is the clamp means 30. The clamp means is coupled to the top wall of the housing and securable to a frame 32 of a bicycle. The clamp means is used for holding the housing in a rigid stationary position. In one embodiment, two clamps 34 are used for securing the housing to a bicycle frame. In another embodiment, a key-lockable clamp means is used for securing the housing to the bicycle frame.

Figure 9:
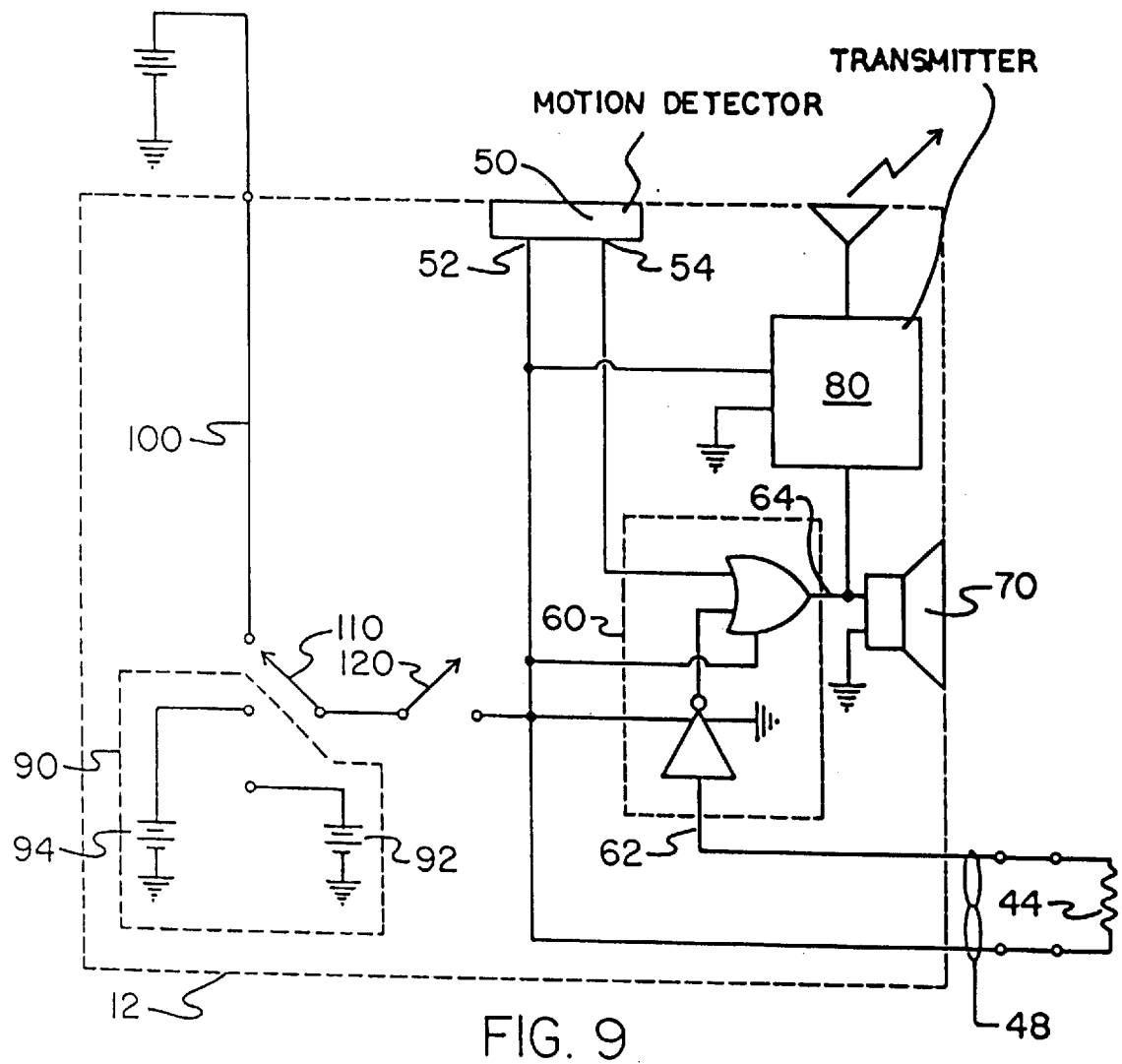
FIG. 9 is a schematic block diagram of the bicycle component of the present invention.
Figure 10:
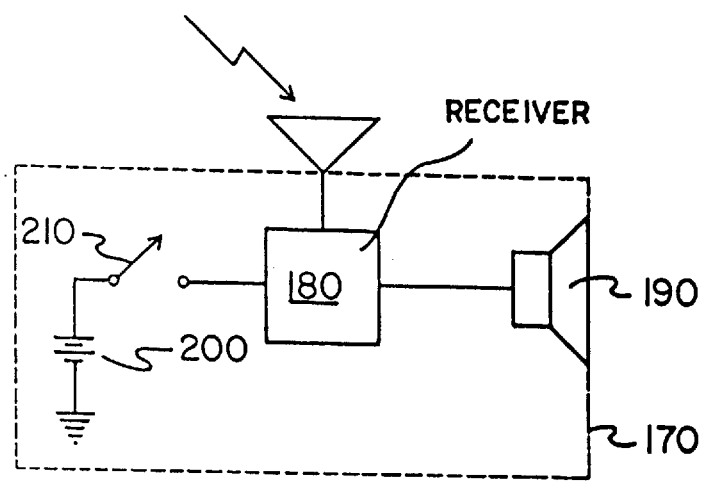
FIG. 10 is a schematic block diagram of the user component of the present invention.

The third subcomponent of the bicycle component is the key-lockable clamp 40. The key-lockable clamp is adapted for securing the bicycle for preventing its motion. The key-lockable clamp is used to secure a bicycle to an external rigid stationary object. The key-lockable clamp has a rigid tubular locking segment 41. The locking segment has two open ends and two spaced slots formed thereon between the ends. The key-lockable clamp also includes a rigid U-shaped and electrically-conductive locking bracket 42. The locking bracket has two free ends. The free ends of the locking bracket are positionable within the slots of the locking segment. A key-actuatable locking mechanism 43 is disposed within one end of the locking segment. This locking mechanism is adapted to receive a key. The locking mechanism has an locked position for securing the locking bracket to the locking segment, thereby allowing the securement of a bicycle and recipient fixed object therein, thus precluding movement of the bicycle. The locking mechanism also has an unlocked position for allowing the locking bracket to be removed from the locking segment, thereby releasing the bicycle for movement. The key-lockable clamp also includes an electrically-conductive alarm cable 44. The alarm cable has a first terminal pair and a second terminal pair. The first terminal pair of the alarm cable is coupled to the ends of the locking bracket when placed in the locked position. The disposition of the second terminal may be clearly seen in FIGS. 1 & 9. In this configuration, an electrically-conductive locking circuit is defined.

The fourth subcomponent of the bicycle component is the key-lockable cable mechanism 45. The key-lockable cable mechanism is adapted for securing a bicycle to a recipient object. It is used when the key-lockable clamp cannot accommodate the particular object to which a bicycle is to be secured. The key-lockable cable mechanism has a rigid elongated locking base 46. The locking base is integral with the locking segment 41 of the key-lockable clamp 40 and extended outwardly therefrom in a direction opposite the locking bracket. The key-lockable cable mechanism includes a flexible sheathed locking cable 47. The cable has a fixed end secured to one end of the locking base and a free end 48 removably securable to the other end of the locking base. The key-lockable cable mechanism includes a key-actuatable locking mechanism 49. The locking mechanism is extended from the locking base. The locking mechanism has a locked position for securing the free end of the locking cable to the locking base. The locking mechanism also has an unlocked position for allowing the free end of the locking cable to be removed from the locking base.

The fifth subcomponent of the bicycle component is the motion detector 50. The motion detector is extended from the housing 12. The motion detector has an input terminal 52 and an output terminal. The output terminal of the motion detector transmits a motion detection signal when electrically energized through its input terminal and when actuated by intrusive motion of the housing with respect to the frame 32 of the bicycle. Thus, if the housing is intrusively tampered with when the present invention is activated, the motion detection signal is generated. The output terminal of the motion detector transmits no motion detection signal when the housing is not moved with respect to the bicycle frame. The motion detector is conventional in design and is formed of commercially available components.

The sixth subcomponent of the bicycle component is the controller circuitry 60. The controller circuitry is disposed within the housing 12. The controller circuitry has a first input terminal 62 coupled to a second terminal on free end 48 of the alarm cable 47. The controller circuitry also has a second input terminal coupled to the output terminal 54 of the motion detector. The controller circuitry has an output terminal 64. The controller circuitry has one mode for transmitting an alarm activation signal through the output terminal upon receipt of a motion detection signal from the motion detector 50. The controller circuitry also has another mode for transmitting an alarm activation signal through the output terminal when the locking circuit is intrusively broken such as when the key-lockable clamp is placed in the locked position and a thief subsequently tries to cut through it. To accomplish the foregoing function, the control circuitry includes an OR gate with an output which constitutes the output terminal of the controller circuit. An inverter is also included with an input which constitutes the first input terminal and an output connected to a first input of the OR gate. A second input of the OR gate constitutes the second input terminal of the controller circuitry.

The seventh subcomponent of the bicycle component is the speaker 70. The speaker is disposed within the housing 12 and coupled to the output terminal 64 of the controller circuitry. The speaker transmits an audible high frequency alarm signal upon receipt of the alarm activation signal. Otherwise, the speaker is inactive. The speaker is positioned adjacent to the perforated side wall of the housing 12 for transmitting the alarm signal therethrough with a resonant quality.

The eighth subcomponent of the bicycle component is the transmitter 80. The transmitter disposed within the housing 12 and is coupled to the output terminal of the controller circuitry. The transmitter includes an antenna. The transmitter transmits an audible alarm signal to a remote location through space using its antenna upon receipt of the alarm activation signal. The transmitter is conventional in design and commercially available.

The ninth subcomponent of the bicycle component is the power source 90. The power source is disposed within the housing 12. The power source is used for supplying electrical energy. The power source is formed of a main battery 92 and a replaceable back-up battery 94. The batteries may be replaced when their energy has been expended. The batteries are conventional in design and commercially available.

The tenth subcomponent of the bicycle component is the power cable 100. The power cable is electrically-conductive and has an interior terminal end and an exterior terminal end formed in the shape of a plug. The exterior terminal extended from the housing and is coupleable to an external power source 102 for receiving electrical energy therefrom. This external power source can be a battery of a vehicle or a conventional household electrical socket. Thus, the power cable serves as an external power source for the bicycle component while the main battery 92 and back-up battery 94 serve as an internal power source for the bicycle component.

The eleventh subcomponent of the bicycle component is the power switch 110. The power switch is disposed within the housing. The power switch is coupled between the internal power source and interior terminal of the power cable. The power switch has a first orientation for allowing electrical energy to be supplied from the main battery 92 of the power source. The power switch has a second orientation for allowing electrical energy to be supplied from the back-up battery 94 of the power source. Lastly, the power switch has a third orientation for allowing electrical energy to be supplied through the power cable 100. The power switch further has a fourth orientation for precluding power from being supplied. The power switch is accessible when the lid of the container 12 is opened.

The twelveth subcomponent of the bicycle component is the activation switch 120. The activation switch is both mechanical and electrical in design. The activation switch is adapted to be actuated by a key and is lockable. The activation switch is coupled between the power switch 110, the motion detector 50, a second terminal end of the alarm cable 48, and the controller circuitry 60. Furthermore, the activation switch is extended through the lid 22 of the housing. The activation switch has a locked orientation when actuated by a key for securing the lid to the housing while simultaneously allowing delivery of electrical energy to the motion detector, the alarm cable, and the controller circuitry. The activation switch has an unlocked orientation when actuated by a key for allowing the lid to be opened while simultaneously preventing the delivery of electrical energy. The activation switch can employ another orientation when actuated by a key that allows that lid to be secured to the housing but prevents the motion detector, the alarm cable, and the controller circuitry from being energized.

The thirteenth subcomponent of the bicycle component is the holding clamp 130. The holding clamp is rigid in structure and coupled to the bicycle. The holding clamp is used for holding the key-lockable clamp therein when it is not being utilized for securing the bicycle.

The fourteenth subcomponent of the bicycle component is the key 140. The key is used for locking the key-lockable clamp. The key is also used for actuating and locking the activation switch. In an alternate embodiment, the key is also used for locking the clamp means that secures the housing of the present invention to a bicycle.

The second major component is the user component 150. The user component essentially includes six subcomponents. The subcomponents are the strap, container, receiver, speaker, battery, and power switch. These subcomponents are interrelated to allow the user component to perform its intended function.

The first subcomponent of the user component is the strap 160. The strap is elongated and formed of nylon, leather, or other such flexible material. The strap has securement means 162 on one end and securable means 164 on the other end. The securable means is coupleable with the securement means in a closed loop configuration about a wrist of a user. In the preferred embodiment, the securement means is a buckle and the securable means is a plurality of holes formed on the strap. Other such securement means and securable means like pile-type fasteners, snaps, or buttons can be utilized.

The second subcomponent of the user component is the container 170. The container is rigid and box-shaped in structure. The container has a bottom wall 172, a top wall 174, and a periphery of four side walls 176 interconnecting the top wall with the bottom wall to define a hollow interior. The bottom wall of the container is coupled to the strap between its ends.

The third subcomponent of the user component is the receiver 180. The receiver is disposed within the container. The receiver includes an antenna. The receiver is used for transmitting an alarm activation signal upon receipt of the alarm signal from the transmitter of the bicycle component 10 through its antenna. The receiver is conventional in design and commercially available. It should be noted that satellite technology may be employed in combination with the receiver and transmitter so as to afford optimal communication therebetween.

The fourth subcomponent of the user component is the speaker 190. The speaker is disposed within the container, coupled to the receiver 180, and extended through the top wall of the container. The receiver is used for transmitting an audible high frequency-alarm upon receipt of the alarm activation signal. Otherwise, the speaker is inactive. Other alarm indication mechanisms may be utilized such as a lamp or vibrator.

The fifth subcomponent of the user component is the battery 200. The battery is disposed within the container. The battery is used for supplying electrical energy. The battery may be replaced when its electrical energy has been expended. The battery is conventional in design and commercially available.

The sixth subcomponent of the user component is the power switch 210. The power switch is coupled between the battery and receiver. The power switch is also extended through the top wall of the container. The power switch has one orientation for allowing electrical energy to be delivered to the receiver. The power switch has another orientation for preventing electrical energy from being delivered to the receiver. In the preferred embodiment, the power switch is formed of two depressible buttons with one button allowing electrical energy to be delivered to the receiver and the other button preventing electrical energy from being delivered to the receiver.

The present invention alerts a user when a bicycle is being disturbed—probably by a would-be thief. The critical components of the present invention are mounted in a strong steel housing coated with rubber and mounted to a frame of a bicycle below the seat. The housing is 6 inches long, 4 inches wide, and 2½ inches deep and is equipped with a lock. The housing contains a high-frequency alarm, transmitter, motion detector, and batteries. Pinholes or perforations in the housing echo or resonate the audible alarm from the speaker. A lockable clamp prevents the bicycle from being moved, and the lockable clamp is wired to the alarm system. When the present invention is activated, the transmitter sends an alarm signal to a wrist band worn by a user. The high-frequency sound that is heard is distinctive and unmistakable, clearly emanating from the system. The alarm may also be transmitted to a user component formed as a fob on a key chain. Disarming the present invention is almost impossible because it contains a motion detector and electronics which react to any disturbance in the wiring, the lockable clamp, or the housing itself. The present invention is compact and lightweight and utilizes components which are readily available.

In another embodiment, as shown in FIGS. 11–13, changes are made to accommodate other entities such as homes, cars and the like. As best shown in FIG. 13, such embodiment includes a keypad controlled security mechanism 220 coupled to a conventional door bell 222. The keypad controlled security mechanism has a keypad 224 adapted to emit an alarm disarm signal upon the depression of a predetermined sequenced set of keys and further the subsequent depression of the door bell for a predetermined time period of preferably 15–30 seconds. To further prevent unlawful entry to the entity by means of confusing a perpetrator, the keypad has a matrix of keys with numbers and letters printed thereon out of order. Ideally, such keys further include an switch labeled "activation switch" to falsely indicate that disarming of an associated alarm system is accomplished via the depression of a set of keys including the activation key. As such, if a perpetrator were to have a clue to what the required code might be, unlawful entry to the entity is still prevented.

Further included in the present embodiment is a movement detector 226, as shown in FIG. 12. Such movement detector is situated within a portable housing 228 having a magnet 230 formed thereon for allowing the coupling thereof to an access to the entity. The magnet allows the securement of the movement detector to a window sill, door, or the like. Optionally, with the inclusion of another magnet, coupling with a curtain and the like is afforded. The movement detector has a movement detection means 232 adapted to generate a movement signal upon the vibration or moving of the movement detector. Ideally, the movement detector comprises one of many commonly known devices which are able to detect movement in the formed of moving, vibration, and the like of the item which the device is attached to. The movement detector further includes a movement detection transmitter 234 connected to the movement detection means. In operation, the movement detector transmitter is adapted for transmitting a remote motion detection signal via free space upon the receipt of the movement signal. To further afford portability, the movement detector is powered by a battery 236 situated within the portable housing thereof. A plurality of movement detectors may be provided to afford monitoring of a plurality of access ways to the entity.

As shown in FIG. 11, controller circuitry 238 is situated within a housing. Notwithstanding a few exceptions, the controller circuitry is substantially the same as the previously described controller circuitry. The present controller circuitry has a first input terminal 240 coupled to the keypad controlled security mechanism. A second input terminal 242 is coupled to a 244 movement detector receiver which is also situated within the housing. Upon the receipt via free space of the remote motion detection signal, the movement detector receiver is adapted to generate an alarm activation signal at an output thereof. As in the previous embodiment, the present embodiment also has an output terminal 246 having two modes. In the present embodiment, the controller circuitry has one mode for transmitting an alarm activation signal upon receipt of the alarm activation signal without the receipt of the alarm disable signal. Another mode is included for precluding the transmission of an alarm activation signal upon the receipt of the alarm disarm signal. The control circuitry preferably employs a conventional AND gate in lieu of the OR gate of the prior embodiment to afford operability.

It should be noted that the present embodiment is adapted to work in conjunction with a conventional alarm 250. Such conventional alarm ideally has an associated speaker 252 coupled to the output terminal of the controller circuitry. As such, in use, the speaker transmits an audible high frequency alarm signal upon receipt of the alarm activation signal.

Also included is a transmitter 254 located within the housing and coupled to the output terminal of the controller circuitry. By this interconnection, the transmitter is adapted to transmit an alarm signal to a remote location through space upon receipt of the alarm activation signal. To provide long distance transmission, a satellite or cellular technology may be employed.

A power source is located within the housing. The power source is coupled to the keypad controlled security mechanism, the controller circuitry, the movement detector receiver, and the transmitter for supplying electrical energy thereto. Preferably, the power source is formed of a main battery and a back-up battery. It should be noted that, in the present embodiment, a line 256 is provided to ensure that the conventional alarm, too, is given back-up battery power when needed.

It should be further noted that, in the present embodiment, the power switch, power cable, and user component are essentially the same as set forth in the previous embodiment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An alarm system for preventing unauthorized access to an entity comprising, in combination:

a keypad-controlled security mechanism coupled to a conventional door bell, the keypad-controlled security mechanism having a keypad adapted to emit an alarm disarm signal upon the depression of a predetermined sequenced set of keys and further the subsequent depression of the door bell, wherein the keypad has a matrix of keys with numbers and letters printed thereon out of order;

a movement detector situated within a portable housing having a magnet formed thereon for allowing the coupling thereof to an access to an entity, the movement detector having a movement detection means adapted to generate a movement signal upon the movement of the movement detector and a movement detection transmitter connected to the movement detection means for transmitting a remote motion detection signal via free space upon the receipt of the movement signal, wherein the movement detector is powered by a battery situated within the portable housing thereof;

controller circuitry situated within a housing having a first input terminal coupled to the keypad-controlled security mechanism, a second input terminal coupled to a movement detector receiver also situated within the housing which is adapted to generate a first alarm activation signal at an output thereof upon the receipt via free space of the remote motion detection signal, and an output terminal having one mode for transmitting a second alarm activation signal upon receipt of the first alarm activation signal without the receipt of the alarm disarm signal and another mode for precluding the transmission of the second alarm activation signal upon the receipt of the alarm disarm signal;

an alarm with an associated speaker coupled to the output terminal of the controller circuitry for transmitting an audible high frequency alarm signal upon receipt of the second alarm activation signal;

a user-component transmitter located within the housing and coupled to the output terminal of the controller circuitry for transmitting an alarm signal to a remote location through space upon receipt of the second alarm activation signal;

a power source located within the housing and coupled to the keypad-controlled security mechanism, the controller circuitry, the movement detector receiver, and the user-component transmitter for supplying electrical energy thereto, wherein the power source is formed of a main battery and a back-up battery;

a power cable having an interior terminal end and an exterior terminal end with the exterior terminal end coupleable to an external power source for receiving electrical energy therefrom;

a power switch located within the housing and coupled between the internal power source and interior terminal of the power cable with the power switch having a first orientation for allowing electrical energy to be supplied from the main battery of the power source, a second orientation for allowing electrical energy to be supplied from the back-up battery of the power source, and a third orientation for allowing electrical energy to be supplied through the power cable; and a user component comprising a flexible strap having securement means on one end and securable means on the other end with the securable means coupleable with the securement means in a closed loop configuration about a wrist of a user; a rigid box-shaped container having a bottom wall coupled to the strap between the ends thereof, a top wall, and a periphery of four side walls interconnecting the top wall with the bottom wall to define a hollow interior; a receiver disposed within the container for transmitting a third alarm activation signal upon receipt of the alarm signal from the user-component transmitter; a speaker disposed within the container, coupled to the receiver, and extended through the top wall of the container for transmitting an audible high-frequency alarm upon receipt of the third alarm activation signal; a battery disposed within the container for supplying electrical energy; and a power switch coupled between the battery and receiver and extended through the top wall of the container and with the power switch having one orientation for allowing electrical energy to be delivered to the receiver and another orientation for preventing such delivery.

2. An alarm system for preventing unauthorized access to an entity comprising:

a movement detector situated within a portable housing coupled to an access to an entity, the movement detector having a movement detection means adapted to generate a movement signal upon the movement of the movement detector, a movement detection transmitter connected to the movement detection means for transmitting a remote motion detection signal via free space upon the receipt of the movement signal, wherein the movement detector is powered by a battery situated within the portable housing thereof;

controller circuitry having an input terminal coupled to a movement detector receiver which is adapted to generate a first alarm activation signal at an output thereof upon the receipt via free space of the remote motion detection signal and an output terminal for transmitting a second alarm activation signal upon receipt of the first alarm activation signal at the input terminal thereof;

a user-component transmitter coupled to the output terminal of the controller circuitry for transmitting an alarm signal to a remote location through space upon receipt of the alarm activation signal;

a power source coupled to the controller circuitry, the movement detection receiver, and the user-component transmitter for supplying electrical energy thereto;

a user component comprising a receiver for transmitting a third alarm activation signal upon receipt of the alarm signal from the user-component transmitter; alarm means coupled to the receiver for transmitting an alarm upon receipt of the third alarm activation signal; and power source means for energizing the receiver; and a keypad-controlled security mechanism having a keypad adapted to emit an alarm disarm signal upon the depression of a predetermined sequenced set of keys, wherein the controller circuitry is adapted to transmit the second alarm activation signal at the output terminal thereof only upon receipt of the motion detection signal without the receipt of the alarm disable signal and further precludes the transmission of the second alarm activation signal upon the receipt of the alarm disable signal;

wherein the keypad has a matrix of keys with numbers and letters placed out of order.

3. An alarm system for preventing unauthorized access to an entity comprising:

a movement detector situated within a portable housing coupled to an access to an entity, the movement detector having a movement detection means adapted to generate a movement signal upon the movement of the movement detector, a movement detection transmitter connected to the movement detection means for transmitting a remote motion detection signal via free space upon the receipt of the movement signal, wherein the movement detector is powered by a battery situated within the portable housing thereof;

controller circuitry having an input terminal coupled to a movement detector receiver which is adapted to generate a first alarm activation signal at an output thereof upon the receipt via free space of the remote motion detection signal and an output terminal for transmitting a second alarm activation signal upon receipt of the first alarm activation signal at the input terminal thereof;

a user-component transmitter coupled to the output terminal of the controller circuitry for transmitting an alarm signal to a remote location through space upon receipt of the second alarm activation signal;

a power source coupled to the controller circuitry, the movement detection receiver, and the user-component transmitter for supplying electrical energy thereto;

a user component comprising a receiver for transmitting a third alarm activation signal upon receipt of the alarm signal from the user-component transmitter; alarm means coupled to the receiver for transmitting an alarm upon receipt of the third alarm activation signal; and power source means for energizing the receiver; and a keypad-controlled security mechanism having a keypad adapted to emit an alarm disarm signal upon the depression of a predetermined sequenced set of keys, wherein the controller circuitry is adapted to transmit the second alarm activation signal at the output terminal thereof only upon receipt of the motion detection signal without the receipt of the alarm disarm signal and further precludes the transmission of the second alarm activation signal upon the receipt of the alarm disarm signal, wherein the keypad has a matrix of keys with numbers and letters placed out of order, and wherein the keypad is coupled to a conventional door bell, whereby the keypad is adapted to emit the alarm disarm signal upon the depression of a predetermined sequenced set of keys and further the subsequent depression of the door bell for a predetermined time period.

\* \* \* \* \*